United States Patent Office 3,591,514
Patented July 6, 1971

3,591,514
STABILIZATION OF OZONE DERIVATIVES
Richard D. Smetana, Beacon, Roger G. Duranleau, Poughquag, and Alfred Arkell, Wappingers Falls, N.Y., assignors to Texaco Inc., New York, N.Y.
No Drawing. Filed Apr. 4, 1969, Ser. No. 813,766
Int. Cl. C01b 13/00
U.S. Cl. 252—186            8 Claims

ABSTRACT OF THE DISCLOSURE

Stabilized compositions comprising an alkali metal fluoride and ozone derivative selected from the group consisting of oxolane of the formula:

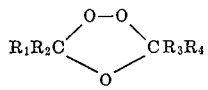

and alkoxyhydroperoxides of the formula:

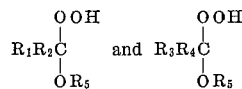

where $R_1$, $R_2$, $R_3$ and $R_4$ are hydrogen or hydrocarbyl and $R_5$ is alkyl and a method of producing said stabilized oxolanes and hydroperoxides comprising contacting in the presence of an alkali metal fluoride an olefin of the formula $$R_1R_2C=CR_3R_4$$

with ozone or ozone and alkanol of the formula $R_5OH$.

BACKGROUND OF INVENTION

The ozone derivatives which are stabilized herein are useful in the preparation of epoxides as described in copending applications, Ser. Nos. 808,347 and 808,348, filed Mar. 18, 1969.

One of the problems associated with the oxolanes and alkoxyhydroperoxide reactants in the preparation of their epoxide derivatives is these reactants tend to deteriorate during storage thereby substantially enhancing their ultimate cost. There was, therefore, a need to develop a means to inhibit such decomposition.

SUMMARY OF INVENTION

We have discovered, and this constitutes our invention, a means of stabilizing ozone derivatives selected from the group consisting of oxolanes of the formula:

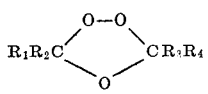

and alkoxyhydroperoxides of the formula:

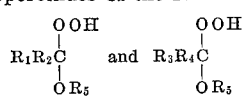

where $R_1$, $R_2$, $R_3$ and $R_4$ are hydrogen or alkyl, aryl, alkylaryl or arylalkyl of from 1 to 40 carbons, and $R_5$ is alkyl of from 1 to 20 carbons.

More specifically, our invention comprises the aforedescribed ozone derivatives containing between about 0.1 and 70 mole percent of an alkali metal fluoride. The incorporation of the alkali metal derivative may take place during or after derivative preparation, the former being preferred.

DETAILED DESCRIPTION OF THE INVENTION

One means of preparing the compositions of the invention is to interdisperse throughout previously formed ozone derivative between about 0.1 and 70 wt. percent based on said derivative of an alkali metal fluoride. Interdispersal can be brought about by standard means such as mixing a finely divided fluoride directly with ozone derivative or in the presence of a volatile inert liquid diluent such as chloroform, carbon tetrachloride, pentane and hexane followed by the removal of the diluent.

An alternative method of preparing the stabilized compositions of the invention comprises contacting an olefin of the formula:

$$R_1R_2C=CR_3R_4$$

where $R_1$, $R_2$, $R_3$ and $R_4$ are as heretofore defined, with ozone or alternatively with ozone and alkanol of the formula $R_5OH$ where $R_5$ is as heretofore defined, in the presence of alkali metal fluoride at a temperature between about −100 and 100° C. utilizing a mole ratio of olefin to ozone of between about 1:1 and 20:1, a mole ratio of olefin to alkanol of between about 1:20 and 20:1 and a mole ratio of olefin to alkali metal fluoride of between about 1:1 and 100:1, advantageously for a period between about 0.5 and 10 hours or until the desired yield is obtained under a pressure of between about 1 and 100 atmospheres.

If needed to facilitate contact in the ozone derivative preparation in the presence of the stabilizing alkali metal fluoride, inert solvent may be employed together with agitation such as stirring. Suitable examples of inert solvents are the liquid paraffins, halogenated paraffins and dialkyl ethers, such as chloroform, methylene chloride, pentane and diethyl ether. Solvent quantities between about 80 and 99 wt. percent of the reaction mixture are utilized under preferred conditions, but lesser amounts may be employed.

Normally, the ozone is utilized in admixture with oxygen or air, said admixture containing between about 0.1 and 15 mole percent ozone.

The formed alkali metal fluoride stabilized oxolanes and alkoxyhydroperoxides are isolated by standard means such as removing excess olefin and alcohol (if present) via vacuum distillation leaving the stabilized alkoxyhydroperoxide or oxolane as residue.

The following equations further illustrate the preparation of the stabilized oxolane and alkoxyhydroperoxide derivatives:

A. 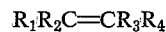

B.
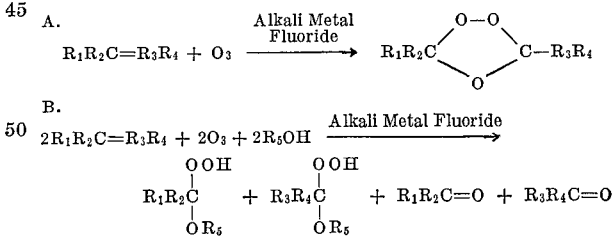

where $R_1$, $R_2$, $R_3$, $R_4$ and $R_5$ are as heretofore defined. As can be seen from the foregoing equations, when $R_1$ and $R_2$ differ from $R_3$ and $R_4$ in the preparation of alkoxyhydroperoxide, a mixture of hydroperoxides is formed.

Examples of the alkali metal fluorides contemplated herein are potassium fluoride, sodium fluoride, lithium fluoride, cesium fluoride, rubidium fluoride and francium fluoride. In order to insure maximum contact the alkali metal fluorides are normally utilized in a finely divided state ranging from powdered to granular form (e.g., .001″ to 1/16″ diameter).

Examples of the olefins contemplated herein are the substituted and unsubstituted alkenes such as 1-octene, 2-octene, 1-pentene, 2-pentene, 1-hexene, 2-mehyl-1-pentene, alpha-methylstyrene, 3-(3-m-ethylphenyl) - 1 - propene; ortho-, meta- and para-diisopropenylbenzene; ortho-, meta- and para-isopropenylcumene.

Specific examples of the alkanols contemplated herein are methanol, ethanol, n-butanol, tertiary butanol, 2-octanol and hexanol.

Specific examples of the alkoxyhydroperoxide products are mixtures of 1-methoxyheptyl hydroperoxide and 1-methoxymethyl hydroperoxide derived from the ozonation of a mixture of methanol and 1-octene, a mixture of 1-methylhexyl hydroperoxide and 1-methoxyethyl hydroperoxide derived from the ozonation of a mixture of methanol and 2-octene; a mixture of 1-propoxy-1-phenylethyl hydroperoxide and 1-propoxymethyl hydroperoxide derived from the ozonation of a mixture of alpha-methylstyrene and 1-propanol; a mixture of 1-ethoxy-2-(m-tolyl) ethyl hydroperoxide and 1-ethoxymethyl hydroperoxide derived from the ozonation of a mixture of 3-(m-tolyl)-1-propene and ethanol.

Examples of the oxolane products contemplated herein are 3-hexyl-1,2,4-trioxolane from 1-octene; 3-methyl-3-propyl-1,2,4-trioxolane from ozonation of 2-methyl-1-pentene; 3-methyl-3-phenyl-1,2,4-trioxolane from ozonation of alpha-methylstyrene; 3-methyl-5-(m-ethylbenzyl)-1,2,4-trioxolane from ozonation of 3-(m-ethylphenyl)-2-butene.

The following examples further illustrate the stabilized products of the invention and their method of preparation:

EXAMPLE I

To a 3-neck 200 ml. flask fitted with a thermometer, gas sparger, rubber sleeve stopper, there was charged 225 grams of chloroform, 11.8 grams (0.10 mole) of alpha-methylstyrene. In the four runs conducted, Runs A and B were representative and Runs C, D and E were comparative. In Run A the potassium fluoride was introduced in the initial reactants. In Run B the potassium fluoride was introduced after completion of the ozonation. In comparative Run C no potassium fluoride was employed. All three flasks were immersed in a Dry Ice-isopropanol bath cooled to −25° C. and held at this temperature. An ozone-oxygen admixture stream (4.1 mole percent ozone) was bubbled at a rate of 600 ml./minute through the solution and bubbling continued until a dark blue color of ozone appeared in the reaction mixture, indicating a complete reaction of the olefin. The oxolane product in Runs A and B was 3-methyl-3-phenyl-1,2,4-trioxolane. The yield of oxolane was recorded. The final reaction mixture was then allowed to heat to room temperature and the amount of decay of oxolane product after 1 and 5 days storage at 27° C. was recorded under atmospheric pressure. The test data and results are recorded below in Table I:

TABLE I

| Run | A | B | C |
|---|---|---|---|
| KF,[1] mole/mole olefin | 1/3 | 1/3 | 0 |
| Oxolane, mole percent yield | 47.5 | 56 | 56 |
| Oxolane decay, mole percent: | | | |
| After 1 day | 3 | 3 | 62 |
| After 5 days | 13 | 12 | 82 |

[1] Granular.

EXAMPLE II

This example further illustrates the preparation of stabilized ozone derivative compositions contemplated herein.

To a 3 neck, 200 ml. flask fitted with thermometer, sparger and rubber sleeve stopper there was charged 200 grams of chloroform, 11.8 grams (0.10 mole) of alpha-methylstyrene. In the four runs conducted Run D was representative and Runs E, F and G were comparative. In Run D there was additionally introduced 25 grams of methanol and 5.8 grams (0.1 mole) of potassium fluoride. In Run E 25 grams of methanol were additionally added. In Run F 5.8 grams (0.1 mole) of potassium fluoride, 25 grams of acetic acid and 200 grams of chloroform and in Run G 25 grams of acetic acid and 200 grams of chloroform were additionally added. All four flasks were immersed in a Dry Ice-isopropanol bath, cooled to 25° C. and held at said temperature. A 4.1 mole percent ozone in oxygen stream was bubbled at the rate of 600 ml./minute through the solution and bubbling was continued until a dark blue color of ozone appeared in the reaction mixture indicating completion of the reaction of the olefin. The alkoxyhydroperoxide in Runs D and E was a mixture of 1-methoxy-1phenylethyl hydroperoxide and 1-methoxymethyl hydroperoxide. In Runs F nad G the hydroperoxide product was a mixture of 1-acetoxy-1-phenylethyl hydroperoxide and 1-acetoxymethyl hydroperoxide. The yield of the hydroperoxide product was recorded and the final reaction mixtures were then allowed to cool to room temperature. The amount of decay of the hydroperoxide product after storage for 1 day at 27° C. was also recorded. The results are reported below in Table II:

TABLE II

| Run | D | E | F | G |
|---|---|---|---|---|
| KF,[1] mole/mole olefin | 1.0 | 0 | 1.0 | 0 |
| Product, yield mole percent: | | | | |
| Methoxyhydroperoxide | 66 | 82 | | |
| Acetoxyhydroperoxide | | | 64 | 87 |
| Mole percent decay of product after 1 day | 14 | 48 | 80 | 53 |

[1] Granular.

We claim:

1. A stabilized ozone derivative composition containing between about 0.1 and 70 mole percent of an alkali metal fluoride and a member selected from the group consisting of an oxolane of the formula:

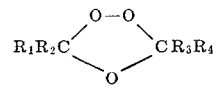

and an alkoxyhydroperoxide of the formula:

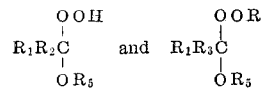

where $R_1$, $R_2$, $R_3$ and $R_4$ selected from the group consisting of hydrogen alkyl, aryl, alkylaryl, and arylalkyl of from 1 to 40 carbons and $R_5$ is alkyl of from 1 to 20 carbons.

2. A composition in accordance with claim 1 wherein said alkali metal fluoride is potassium fluoride.

3. A composition in accordance with claim 2 wherein said olefin is alpha-methylstyrene and said olefin derivative is 3-methyl-3-phenyl-1,2-trioxolane.

4. A composition in accordance with claim 2 wherein said olefin is alpha-methylstyrene and said alkanol is methanol and said alkoxyhydroperoxide is a mixture of 1-methoxy-1-phenyl-ethyl hydroperoxide and 1-methoxymethyl hydroperoxide.

5. A method of preparing a stabilized ozone derivative composition, said composition comprising between about 0.1 and 70 mole percent of alkali metal fluoride and a member selected from the group consisting of an oxolane of the formula:

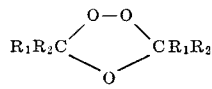

and alkoxyhydroperoxide of the formula:

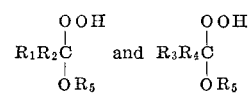

where $R_1$, $R_2$, $R_3$ and $R_4$ are selected from the group consisting of hydrogen alkyl, aryl, alkylaryl and arylalkyl of from 1 to 40 carbons and $R_5$ is alkyl of from 1 to 20 carbons, said method comprising contacting an olefin selected from the group

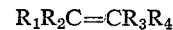

where $R_1, R_2$, $R_3$ and $R_4$ are as heretofore defined with ozone or ozone and alkanol of the formula $R_5OH$ where $R_5$ is as heretofore defined in the presence of alkali metal fluoride at a temperature between about −100 and 100° C. utilizing a mole ratio of olefin to ozone of between about 1:1 and 20:1 or a mole ratio of olefin:ozone:alkanol of between about 1:1:20 and 20:1:1 and a mole ratio of olefin to alkali metal fluoride of between about 1:1 and 100:1 and recovering said composition from the final reaction mixture.

6. A method in accordance with claim 5 wherein said alkali metal fluoride is potassium fluoride.

7. A method in accordance with claim 6 wherein said olefin is alpha-methylstyrene and said ozone derivative is 3-methyl-3-phenyl-1,2,4-trioxolane.

8. A method in accordance with claim 7 wherein said olefin is alpha-methylstyrene, said alkanol is methanol and the ozone derivative is a mixture of 1-methoxy-1-phenylethyl hydroperoxide and 1-methoxymethyl hydroperoxide.

References Cited

UNITED STATES PATENTS

| | | | |
|---|---|---|---|
| 2,527,640 | 10/1950 | Lorand et al. | 252—186 |
| 2,951,869 | 9/1960 | Solomon et al. | 252—186 |

RICHARD D. LOVERING, Primary Examiner

I. GLUCK, Assistant Examiner

U.S. Cl. X.R.

8—111; 23—222; 149—109; 252—95; 260—610